(12) United States Patent
Zhao et al.

(10) Patent No.: US 12,483,724 B2
(45) Date of Patent: Nov. 25, 2025

(54) MULTI-PHASE CROSS COMPONENT PREDICTION

(71) Applicant: Tencent America LLC, Palo Alto, CA (US)

(72) Inventors: Xin Zhao, Palo Alto, CA (US); Jing Ye, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 92 days.

(21) Appl. No.: 18/497,921

(22) Filed: Oct. 30, 2023

(65) Prior Publication Data

US 2025/0088661 A1 Mar. 13, 2025

Related U.S. Application Data

(60) Provisional application No. 63/538,041, filed on Sep. 12, 2023.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/132* (2014.11);
(Continued)

(58) Field of Classification Search
CPC .. H04N 19/593; H04N 19/105; H04N 19/132; H04N 19/136; H04N 19/159;
(Continued)

(56) References Cited

U.S. PATENT DOCUMENTS

2020/0396463 A1\* 12/2020 Zhang .................. H04N 19/176
2021/0314595 A1 10/2021 Zhang et al.
(Continued)

FOREIGN PATENT DOCUMENTS

WO WO-2022170073 A1 \* 8/2022
WO WO-2024079381 A1 \* 4/2024
WO WO-2024260634 A1 \* 12/2024

OTHER PUBLICATIONS

Tencent Technology, ISR/WO, PCT/US2023/036531, Feb. 22, 2024, 11 pgs.

*Primary Examiner* — Marnie A Matt
(74) *Attorney, Agent, or Firm* — Morgan, Lewis & Bockius LLP

(57) ABSTRACT

The various implementations described herein include methods and systems for coding video. In one aspect, a video bitstream includes a current coding block of an image frame and includes a cross-component intra prediction mode. A computing system identifies a sample of the first color component and a sample of the second color component co-located with the sample of the first color component. At least two adjacent samples of the second color component are identified, and a location of each adjacent sample is identified by a horizontal delta coordinate value or a vertical delta coordinate value with respect to the sample of the second color component. The computing system generates the sample of the first color component based on the at least two adjacent samples of the second color component, and reconstructs the current coding block based at least on the generated sample of the first color component.

29 Claims, 7 Drawing Sheets

(51) Int. Cl.
*H04N 19/132* (2014.01)
*H04N 19/136* (2014.01)
*H04N 19/159* (2014.01)
*H04N 19/172* (2014.01)
*H04N 19/176* (2014.01)
*H04N 19/186* (2014.01)
*H04N 19/189* (2014.01)
*H04N 19/70* (2014.01)
*H04N 19/80* (2014.01)

(52) U.S. Cl.
CPC ......... *H04N 19/136* (2014.11); *H04N 19/172* (2014.11); *H04N 19/176* (2014.11); *H04N 19/186* (2014.11); *H04N 19/189* (2014.11); *H04N 19/70* (2014.11); *H04N 19/80* (2014.11)

(58) Field of Classification Search
CPC .. H04N 19/172; H04N 19/176; H04N 19/186; H04N 19/70; H04N 19/80
USPC .................................................... 375/240.12
See application file for complete search history.

(56) References Cited

U.S. PATENT DOCUMENTS

| | | |
|---|---|---|
| 2022/0329816 A1 | 10/2022 | Liu et al. |
| 2024/0292005 A1* | 8/2024 | Ghaznavi Youvalari .................... H04N 19/132 |
| 2024/0414333 A1* | 12/2024 | Jumakulyyev ....... H04N 19/186 |

* cited by examiner

MULTI-PHASE CROSS COMPONENT PREDICTION

RELATED APPLICATIONS

This application claims priority to U.S. Provisional Patent Application No. 63/538,041, entitled "Multi-Phase Cross Component Prediction," filed Sep. 12, 2023, which is hereby incorporated by reference in its entirety.

TECHNICAL FIELD

The disclosed embodiments relate generally to video coding, including but not limited to systems and methods for cross component intra prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes applying a plurality of parameters to implement cross component intra prediction of video data in a cross-component intra prediction (CCIP) mode where each of a plurality of samples of a first color component of a current coding block is determined based on one or more samples of a second color component. A sample of the first color component is determined based on by a linear or non-linear function using a co-located sample and/or at least two adjacent samples of the second color component. In some embodiments, all parameters (e.g., weighing factors, offset) specifying the linear or non-linear function are determined using reconstructed samples of the first and second color components in a neighboring area of the current coding block. Alternatively, in some embodiments, at least a subset or all of the parameters specifying the linear or non-linear function is explicitly signaled via a video bitstream. Under some circumstances, locations of the at least two adjacent samples of the second color component are not symmetric, and have a center that is shifted, with respect to a location of the sample of the first color component. As a decoder applies the adjacent sample(s) of the second color component to predict the sample of the first color components, it compensates spatial misalignment between samples of these two color components caused by different reasons, e.g., artifacts of camera lens, user-controlled video post-processing.

In accordance with some embodiments, a method of video decoding is provided. The method includes receiving a video bitstream including a current coding block of a current image frame. The video bitstream comprises a syntax element for a cross-component intra prediction (CCIP) mode indicating whether each sample of a first color component of the current coding block is determined based on one or more samples of a second color component. The method further includes identifying a sample of the first color component and a sample of the second color component that is co-located with the sample of the first color component in the current coding block. The method further includes for each of two or more adjacent samples of the second color component, obtaining, from the video bitstream, at least one of (i) a horizontal delta coordinate value and (ii) a vertical delta coordinate value with respect to the sample of the second color component. The method further includes identifying each of the at least two adjacent samples of the second color component in the current coding block based on the at least one of (i) the horizontal delta coordinate value and (ii) the vertical delta coordinate value. The method further includes generating the sample of the first color component based on the at least two adjacent samples of the second color component and reconstructing the current coding block based at least on the generated sample of the first color component from the at least two adjacent samples of the second color component.

In some embodiments, the at least two adjacent samples have a geometric center that has an offset from a location of the sample of the second color component. In some embodiments, for each adjacent sample of the second color component, the at least one of the horizontal delta coordinate value and the vertical delta coordinate value includes an integer delta coordinate value. Alternatively, in some embodiments, the at least two adjacent samples of the second color component includes a first adjacent sample, and the at least one of the horizontal delta coordinate value and the vertical delta coordinate value includes a fractional delta coordinate value.

In some embodiments, the first color component and the second color component correspond to two distinct color components of a set of green, blue, and red color components. Alternatively, in some embodiments, the first color component corresponds to a chroma component, and the second color component corresponds to a luma component.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes cross component intra prediction of video data in a cross-component intra prediction (CCIP) mode where each sample of a first color component (e.g., each of a plurality of chroma sample) of the current coding block is determined based on one or more samples of a second color component (e.g., one or more luma samples). The first color component and the second color component are different color components. A sample of the first color component is determined based on by a linear or non-linear function using a co-located sample and/or at least two adjacent samples of the second color component. In some embodiments, parameters (e.g., weighing factors, offset) specifying the linear or non-linear function are derived using reconstructed samples of the first and second color components in a neighboring area of the current coding block. Alternatively, in some embodiments, at least a subset of the parameters specifying the linear or non-linear function is explicitly signaled. Further, in some embodiments, the first and second color components are two distinct color components of the R, G, and B color components. In another example, the first color component is a chroma color component, and the second color component is a luma color component. The luma and chroma color components have different resolutions. Luma samples are converted to a corresponding chroma sample in either resolutions of the luma samples and the chroma samples. Under some circumstances, the at least two adjacent samples of the second color component have a center that is shifted from the sample of the first color component. By these means, as a decoder applies these adjacent samples of the second color component to predict the sample of the first color components, it compensates spatial misalignments between samples of these two color components caused by different reasons, e.g., artifacts of camera lens, user-controlled video post-processing.

Figure 1:
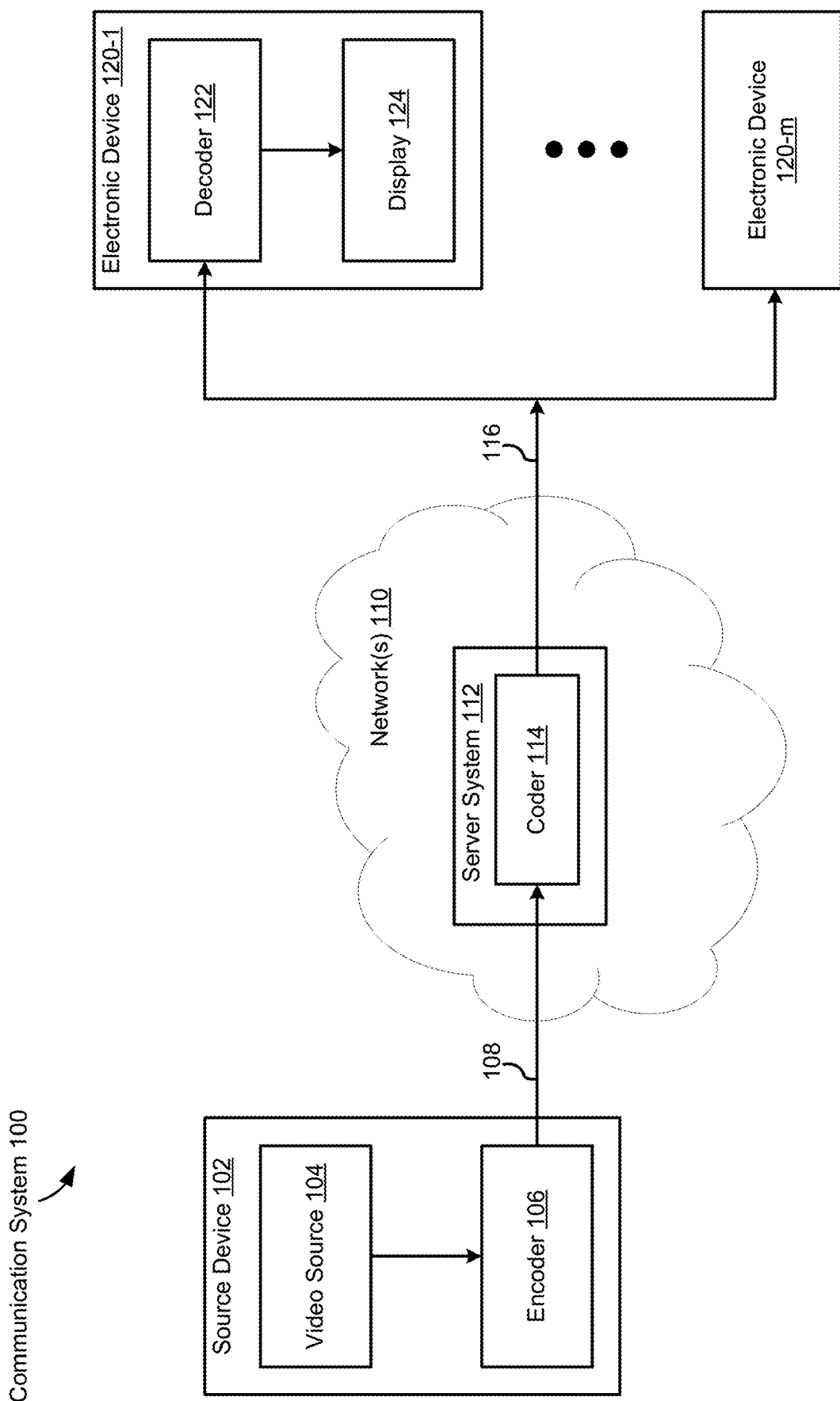
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
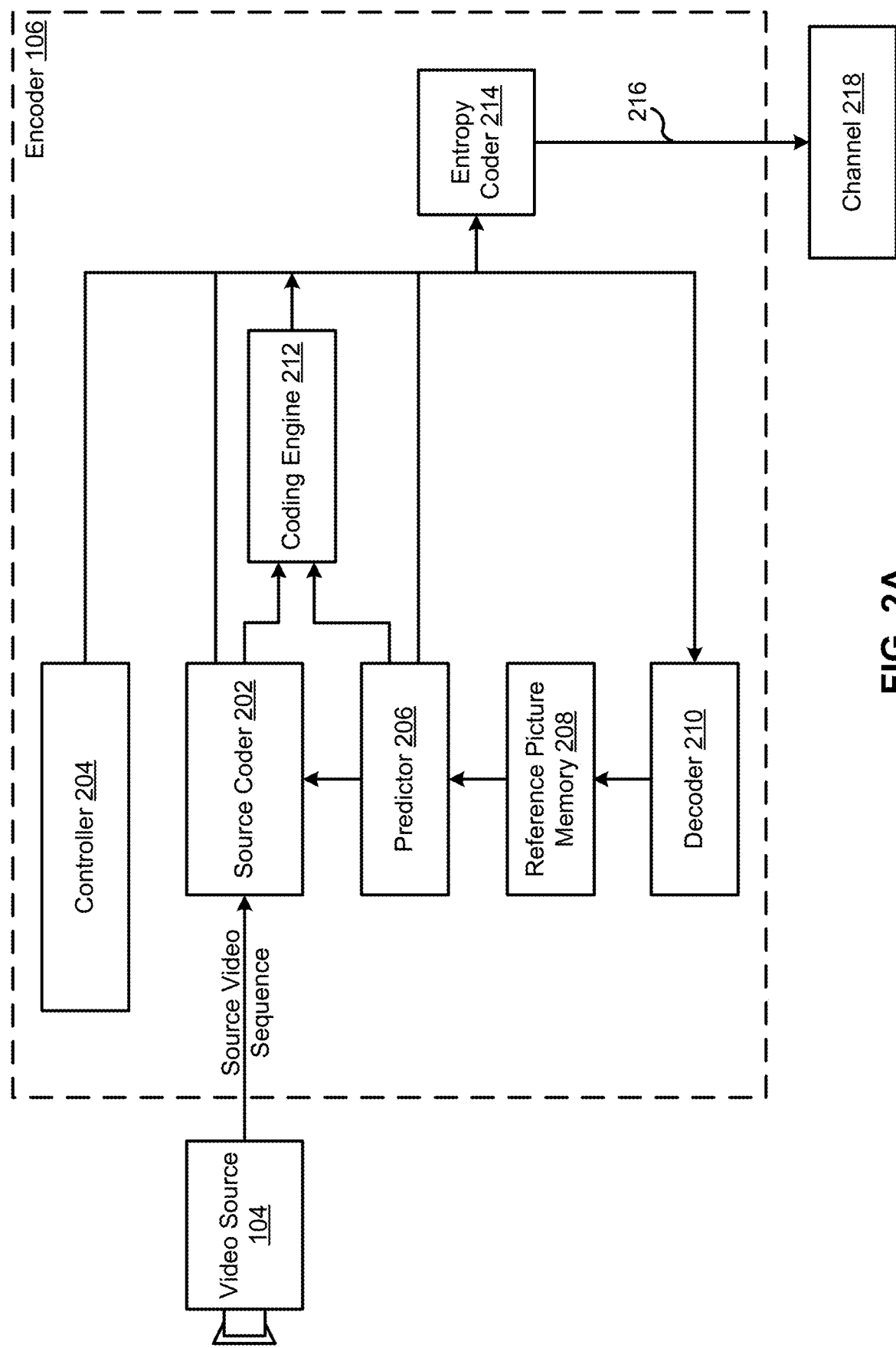
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
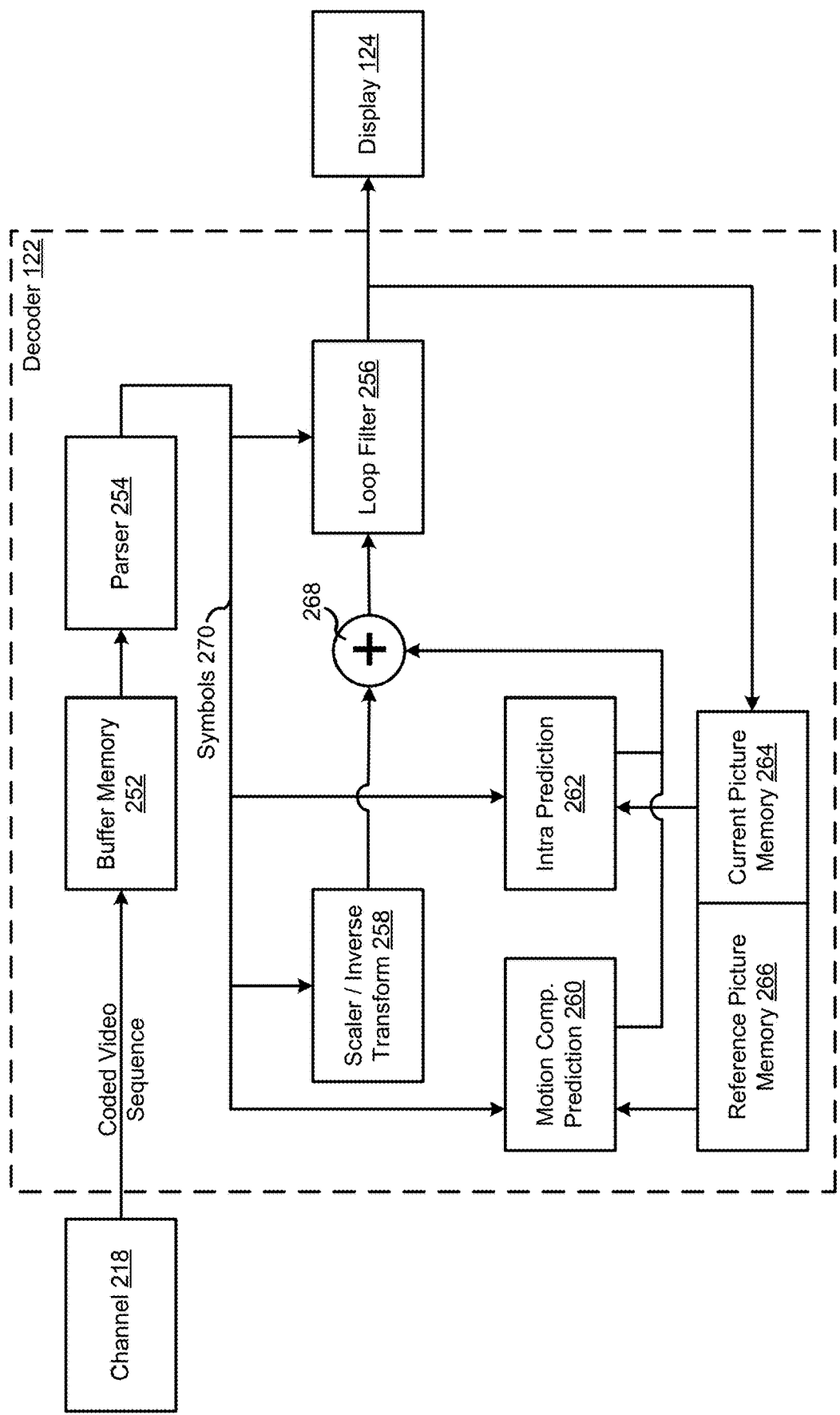
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to reconstruct the original video data more accurately. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
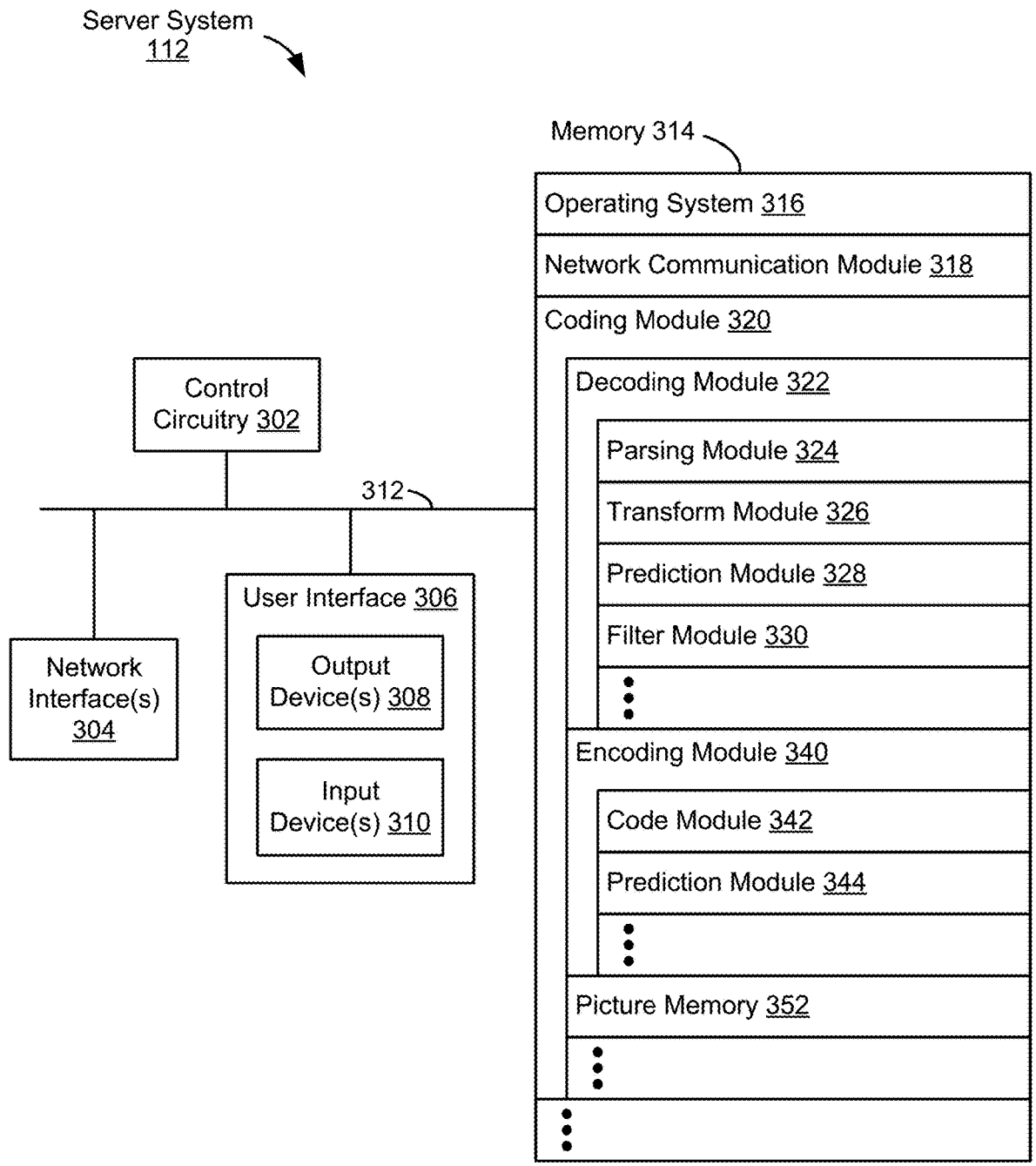
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
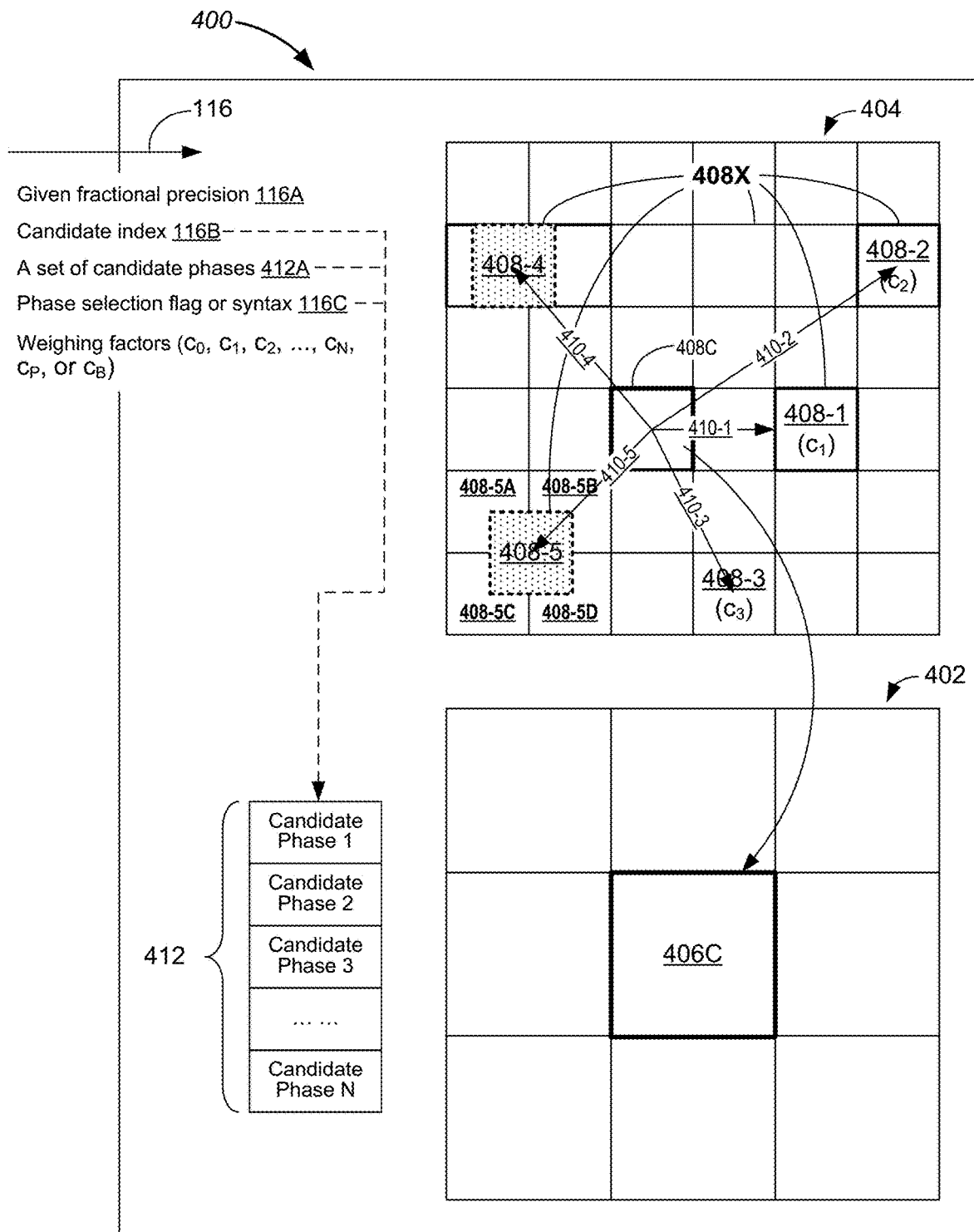
FIG. 4 illustrates an example current coding block including at least two color components, in accordance with some embodiments.

FIG. 4 illustrates an example current coding block 400 including at least two color components 402 and 404, in accordance with some embodiments. A GOP includes a sequence of image frames. The sequence of image frames includes a current image frame that further includes the current coding block 400. A decoder 122 (FIG. 1) receives a video bitstream 116 including the current coding block 400 of a current image frame. The video bitstream 116 comprises a syntax element for a cross-component intra prediction (CCIP) mode indicating whether each of a plurality of samples (e.g., 406C) of a first color component 402 of the current coding block 400 is determined based on one or more samples (e.g., 408C) of a second color component 404. The decoder 122 identifies a sample 406C of the first color component 402 and a sample 408C of the second color component 404 that is co-located with the sample 406C of the first color component 402 in the current coding block 406. The decoder 122 also identifies at least two adjacent samples 408X of the second color component 404 in the current coding block 400. The decoder 122 generates the sample 406C of the first color component 402 based on the at least two adjacent samples 408X of the second color component 404, and reconstructs the current coding block 400 including the sample 406C of the first color component 402 and the sample 408C of the second color component 404.

In some embodiments, the at least two adjacent samples 408X applied to determine the sample 406C of the first color component 402 have a geometric center that has an offset from a location of the sample of the second color component. For example, the at least two adjacent samples 408X include one or more of adjacent samples 408-1, 408-2, and 408-3, and the offset of the geometric center is to the right of the sample 406C of the first color component 402. In another example, the at least two adjacent samples 408X include adjacent samples 408-4 and 408-5, and the offset of the geometric center is to the left of, and on the same row as, the sample 406C of the first color component 402.

In some embodiments, the sample 406C of the first color component 402 is generated by combining the sample 408C and the at least two adjacent samples 408X of the second color component 404 according to one of the following equations:

$$predChromaVal = c_0C + c_1A1 + c_2A2 + \ldots + c_NAN \quad (1.1)$$

$$predChromaVal = c_0C + c_1A1 + c_2A2 + \ldots + c_NAN + c_PP \quad (1.2)$$

$$predChromaVal = c_0C + c_1A1 + c_2A2 + \ldots + c_NAN + c_BB \quad (1.3)$$

$$predChromaVal = c_0C + c_1A1 + c_2A2 + \ldots + c_NAN + c_PP + c_BB \quad (1.4)$$

where predChroma Val is a predicted value of the sample 406C of the first color component 402; C is a value of the sample 408C of the second color component 404 that is co-located with the sample 406C of the first color component 402; A1, A2, . . . and AN are values of the adjacent sample(s) 408X of the second color component 404, where N is a positive integer; P is a non-linear term, e.g., equal to (C*C+a median luma value)>>bitdepth; B is an offset; and $c_0, c_1, c_2 \ldots, c_N, c_P$, and $c_B$ are weighing factors. In some embodiments (e.g., in equation (1.1)), the non-linear term P and the offset B are not applied to predict the sample 406C of the first color component 402. Alternatively, in some embodiments (e.g., in equation (1.2) or (1.3)), only one of the non-linear term P and the offset B is applied to predict the sample 406C of the first color component 402. Alternatively, in some embodiments (e.g., in equation (1.4)), both the non-linear term P and the offset B are applied to predict the sample 406C of the first color component 402. In some embodiments, B is a median luma value or an average luma value of samples of the first color component 402 in the current coding block 400. In some embodiments, one or more of the weighing factors $c_0, c_1, c_2, \ldots, c_N, c_P$, and $c_B$ are received via the video bitstream 116 for combining the at least two adjacent samples 408X of the second color component 404 to generate the sample of the first color component 402.

Alternatively, in some embodiments, the sample 406C of the first color component 402 is generated by combining the at least two adjacent samples 408X of the second color component 404 according to one of the following equations:

$$predChromaVal = c_1A1 + c_2A2 + \ldots + c_NAN \quad (2.1)$$

$$predChromaVal = c_1A1 + c_2A2 + \ldots + c_NAN + c_PP \quad (2.2)$$

$$predChromaVal = c_1A1 + c_2A2 + \ldots + c_NAN + c_BB \quad (2.3)$$

$$predChromaVal = c_1A1 + c_2A2 + \ldots + c_NAN + c_PP + c_BB \quad (2.4)$$

where N is a positive integer, and the sample 408C of the second color component 404 co-located with the sample 406C is not applied to determine the sample 406C.

In some embodiments, the first color component 402 and the second color component 404 correspond to two distinct color components of a set of green, blue, and red (RGB) color components. Alternatively, in some embodiments, the first color component 402 corresponds to a chroma component (e.g., Cr, Cb), and the second color component 404 corresponds to a luma component (e.g., Y). In some embodiments, the second color component 404 (e.g., luma samples) has a higher resolution than the first color component 402 (e.g., chroma samples), and the at least two adjacent samples 408X of the second color component 404 are identified based on a resolution of the second color component 404.

A location of each adjacent sample 408X is identified by a displacement (e.g., 410-1, 410-2, 410-3, 410-4, or 410-5) with respect to the sample 408C of the second color component 404, and the displacement is represented by at least one of a horizontal delta coordinate value and a vertical delta coordinate value. In some embodiments, the at least one of the horizontal delta coordinate value and the vertical delta coordinate value of each adjacent sample 408X of the sample 408C of the second color component 404 is encoded in, and provided to the decoder 122 via, the video bitstream 116. The displacement including the at least one of the horizontal delta coordinate value and the vertical delta coordinate value represents a phase. Each adjacent sample 408X corresponds to a respective phase.

In some embodiments, for each adjacent sample 408X of the second color component 404, the at least one of the horizontal delta coordinate value and the vertical delta coordinate value includes an integer delta coordinate value. For example, the at least two adjacent samples 408X includes a first adjacent sample 408-1, which is identified with respect to the sample 408C by a horizontal delta coordinate value equal to 2 horizontal samples and a vertical delta coordinate value equal to 0. The first adjacent sample 408-1 is on the same row with the sample 408C. In another example, the at least two adjacent samples 408X includes a second adjacent sample 408-2, which is identified with respect to the sample 408C by a horizontal delta coordinate value equal to 3 horizontal samples and a vertical delta coordinate value equal to 2 vertical samples. In another example, the at least two adjacent samples 408X includes a third adjacent sample 408-2, which is identified with respect to the sample 408C by a horizontal delta coordinate value equal to 1 horizontal samples and a vertical delta coordinate value equal to −2 vertical samples. Each of the adjacent samples 408-2 and 408-3 is not located on the same row or column with the sample of the second color component, and the location of the respective adjacent sample 408-2 or 408-3 is identified by both the horizontal delta coordinate value and the vertical delta coordinate value.

Alternatively, in some embodiments, the at least two adjacent samples of the second color component includes an adjacent sample 408-4, which is identified with respect to the sample 408C by a horizontal delta coordinate value equal to −1⅔ horizontal samples and a vertical delta coordinate value equal to 2 vertical samples. In some embodiments, the at least two adjacent samples of the second color component includes an adjacent sample 408-5, which is identified with respect to the sample 408C by a horizontal delta coordinate value equal to −1.5 horizontal samples and a vertical delta coordinate value equal to −1.5 vertical samples. For each of the adjacent samples 408-4 and 408-5, the horizontal delta coordinate value includes a fractional delta coordinate value. In some embodiments, the at least one of a horizontal delta coordinate value and a vertical delta coordinate value has a given fractional precision 116A (e.g., ⅓, ⅒), which is extracted from the video bitstream 116 received from the encoder 106 (FIG. 1). Further, in some embodiments, the given fractional precision 116A is signaled as a high-level syntax selected from: a sequence level parameter, a GOP-level parameter, a picture-level parameter, a subpicture-level parameter, a slice-level parameter, a tile-level parameter, and a largest coding block row level parameter In some embodiments, for the adjacent sample 408-5, which has two fractional delta coordinate values, the decoder 122 identifies a set of neighboring samples 408-5A, 408-5B, 408-5C, and 408-5D of the adjacent sample 408-5 of the second color component 404 based on the fractional delta coordinate values. The adjacent sample 408-4 or 408-5 is interpolated with the set of neighboring samples 408-5A, 408-5B, 408-5C, and 408-5D, and equal to an average of the neighboring samples 408-5A, 408-5B, 408-5C, and 408-5D. The interpolated adjacent sample 408-5 is applied to generate the sample 408C of the first color component 404. More specifically, in some embodiments, a set of weights is generated for the set of neighboring samples 408-5A, 408-5B, 408-5C, and 408-5D based on their distances from the adjacent sample 408-5, and the distances are determined based on the two fractional delta coordinate values. The adjacent sample 408-5 is a weighted combination of the set of neighboring samples 408-5A, 408-5B, 408-5C, and 408-5D. Further, in some embodiments, the set of neighboring samples 408-5A to 408-5D is identified and the adjacent sample 408-5 is interpolated based on a predefined filter. The predefined filter is also applied to determine a sample located at a fractional position of the current image frame in at least one of a motion compensation process and a directional intra predication process.

In some embodiments, the at least two adjacent samples 408X corresponds to a predefined candidate phase (also called candidate displacement, offset, delta coordinate value), and is selected from a plurality of candidate phases 412. For example, the plurality of candidate phases 412 includes three candidate phases (e.g., three candidate delta coordinate value options). A first candidate phase includes the adjacent samples 408-1. A second candidate phase includes the adjacent samples 408-1, 408-2, and 408-3. A third candidate phase includes the adjacent samples 408-3, 408-4, and 408-5. Further, in some embodiments, the video bitstream 116 includes a candidate index 116B that selects one of the plurality of candidate phases 412 for identifying the at least two adjacent samples 404X and the at least one of the horizontal delta coordinate value and the vertical delta coordinate value of each adjacent sample 408X for the sample 408C of the second color component 404. The decoder 122 extracts the candidate index 116B from the video bitstream 116. In some embodiments, the candidate index 116B is signaled in the video bitstream 116 at one of a super block level, coding block level, prediction block level, transform block level, and a fixed block size level. Alternatively, in some embodiments, the candidate index 116B is signaled as a high-level syntax selected from: a sequence level parameter, a GOP-level parameter, a picture-level parameter, a subpicture-level parameter, a slice-level parameter, a tile-level parameter, and a largest coding block row level parameter.

In some embodiments, a set of candidate phases 412A and a candidate index 116B are extracted from the video bitstream 116. The candidate index 116B selects one of a set of candidate phases 116B for identifying the at least two adjacent samples and the at least one of the horizontal delta coordinate value and the vertical delta coordinate value of each adjacent sample 408X for the sample 408C of the second color component 404 of the current coding block 400. The set of candidate phases 412A is selected from a plurality of predefined candidate phases 412, e.g., during a encoding process, and has lower prediction errors than remaining candidate phases of the plurality of predefined candidate phases 412.

In some embodiments, the decoder 122 extracts, from the video bitstream 116, a high-level flag or syntax 116C indicating whether phase selection is applied. In accordance with a determination that the phase selection is applied based on the high-level flag or index 116C, the at least two adjacent samples 408X of the second color component 404 are identified in the current coding block 400 for determining the sample 406C of the first color component 402.

Figure 5:
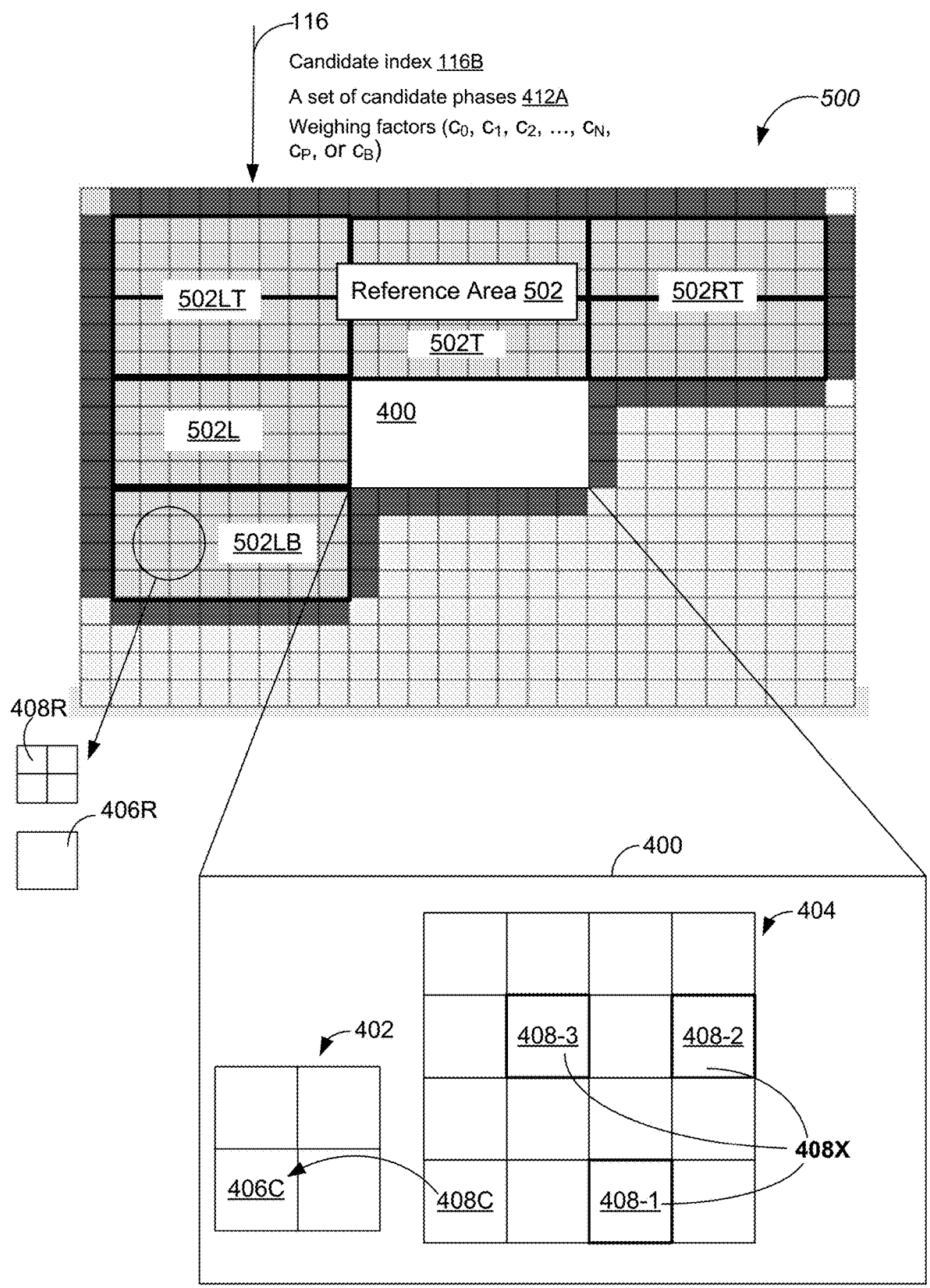
FIG. 5 is an example scheme for generating a sample of a first color component from samples of a second color component 404, in accordance with some embodiments.

FIG. 5 is an example scheme 500 for generating a sample 406C of a first color component 402 from samples 408C and 408X of a second color component 404, in accordance with some embodiments. The sample 406C of the first color component 402 is generated based on a CCIP mode in which each sample of the first color component 402 of a current coding block 400 is determined based on one or more samples of the second color component 404. The sample 406C of the first color component 402 is co-located with a sample 408C of the second color component 404 in the current coding block 400. At least two adjacent samples 408X of the second color component 404 are identified in the current coding block 400. A location of each adjacent sample 408X is identified by at least one of a horizontal delta coordinate value and a vertical delta coordinate value with respect to the sample 408C of the second color component 404. A decoder 122 generates the sample 406C of the first color component 402 based on the at least two adjacent samples 408X of the second color component 404. The current coding block 400 is reconstructed and includes the sample 406C of the first color component 402 and the sample 408C of the second color component 404.

In some embodiments, the decoder 122 identifies a reference area 502 of the current coding block 400 in the current image frame. The reference area 502 includes one or more coding blocks that are adjacent to, and decoded prior to, the current coding block 400. Based on the reference area 502, the decoder 122 determines a candidate index 116B (FIG. 4) that selects one of a plurality of candidate phases 412 for identifying the at least two adjacent samples 408X and the at least one of the horizontal delta coordinate value and the vertical delta coordinate value of each adjacent sample 408X for the current coding block 400. In some embodiments, the reference area 502 includes a plurality of reference samples 406R of the first color component 402 and a plurality of reference samples 408R of the second color component 404. The decoder 122 determines a plurality of prediction errors corresponding to the plurality of candidate phases 412 based on the reference samples 406R of the first color component 402 and the reference samples 408R of the second color component 404. The candidate index 116B identified to represent the selected one of the plurality of candidate phases 412 that provides a minimal prediction error of the plurality of prediction errors.

In some embodiments, the reference area 502 of the current coding block 400 includes one or more of: a top left reference region 502TL, a top reference region 502T, a top right reference region 502TR, a bottom left reference region 502BL, and a left reference region 502L. In an example, the reference area 502 includes the top reference region 502T and the left reference region 502L. Each of the reference region includes one or more coding blocks.

In some embodiments, the at least two adjacent samples 408X of the second color component 404 are combined using one or more weighing factors $c_0, c_1, c_2, \ldots, c_N, c_P$, and $c_B$ to generate the sample 406C of the first color component 402, e.g., based on equations (1.1)-(1.4). Further, in some embodiments, the decoder 122 identifies a reference area 502 of the current coding block 400 in the current image frame, and the reference area 502 includes one or more coding blocks that are adjacent to, and decoded prior to, the current coding block 400. The one or more weighing factors $c_0, c_1, c_2 \ldots, c_N, c_P$, and $c_B$ are determined based on a plurality of reference samples 406R of the first color component 402 and a plurality of reference samples 408R of the second color component 404 that is co-located with the plurality of reference samples 406R of the first color component 402 in the reference area 502. Additionally, in some embodiments, the decoder 122 determines the one or more weighing factors $c_0, c_1, c_2, \ldots, c_N, c_P$, and $c_B$ by determining a least mean square (LMS) value based on the plurality of reference samples 406R of the first color component 402 and the plurality of reference samples 408R of the second color component 404. The one or more weighing factors $c_0, c_1, c_2, \ldots, c_N, c_P$, and $c_B$ are iteratively adjusted to reduce the LMS value until the LMS value satisfy a predefined criterion (e.g., the LMS value is minimized or below an LMS threshold).

In some embodiments, a set of candidate phases 412A and a candidate index 116B are extracted from the video bitstream 116. The candidate index 116B selects one of a set of candidate phases 116B for identifying the at least two adjacent samples 408X and the at least one of the horizontal delta coordinate value and the vertical delta coordinate value of each adjacent sample 408X for the sample 408C of the second color component 404 of the current coding block 400. The set of candidate phases 412A is selected from a plurality of predefined candidate phases 412, e.g., based on a reference area of the current coding block 400 and during a encoding process, and has lower prediction errors than remaining candidate phases of the plurality of predefined candidate phases 412.

Further, in some embodiments, for the current coding block 400, the reference area 502 of the current coding block 400 includes one or more of: a top left reference region 502TL, a top reference region 502T, a top right reference region 502TR, a bottom left reference region 502BL, and a left reference region 502L of the current coding block 400. Each of the reference regions includes one or more coding blocks.

Figure 6:
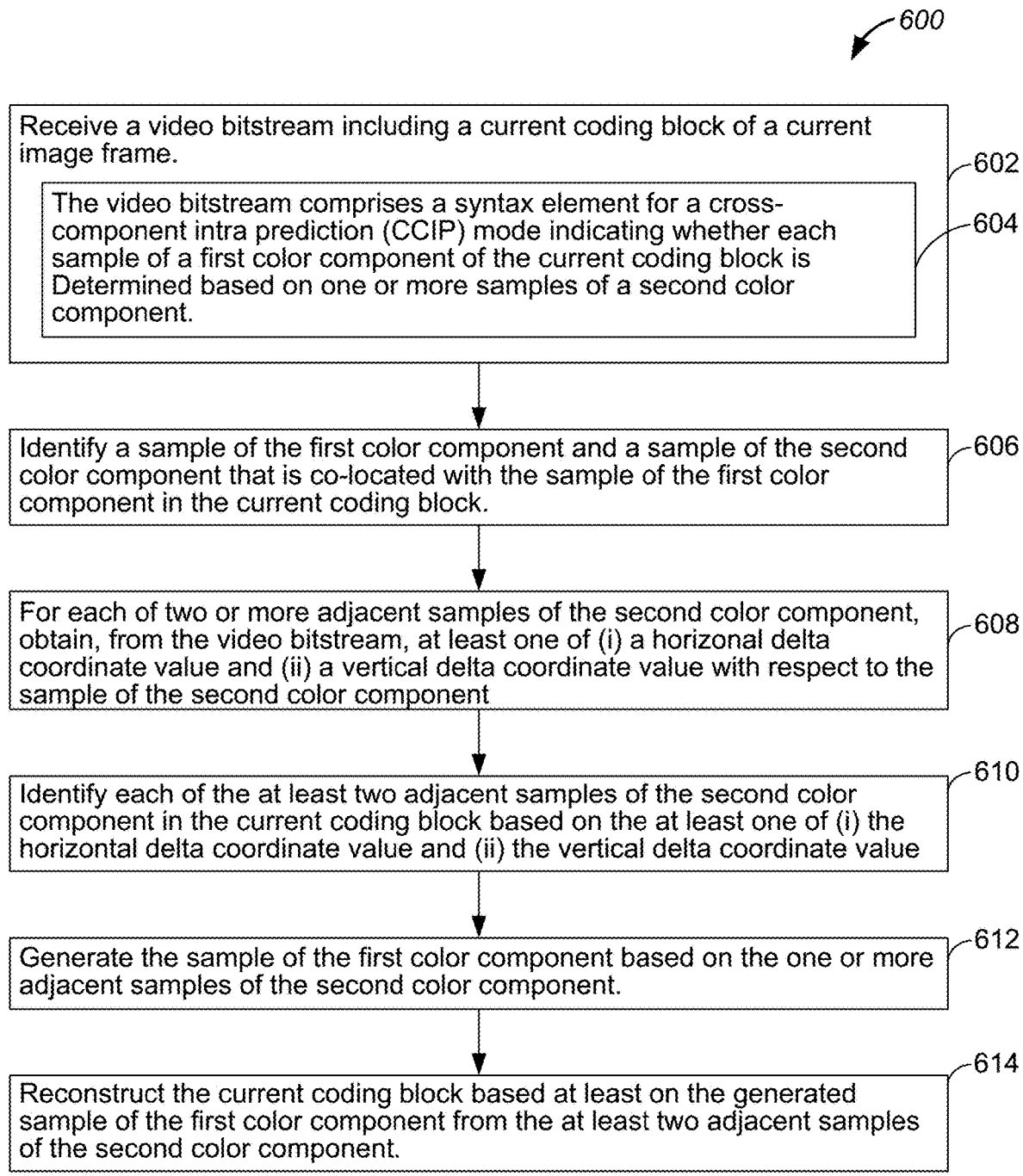
FIG. 6 is a flow diagram illustrating an example method of coding video, in accordance with some embodiments.

FIG. 6 is a flow diagram illustrating an example method 600 of coding video, in accordance with some embodiments. The method 600 may be performed at a computing system (e.g., the server system 112, the source device 102, or the electronic device 120) having control circuitry and memory storing instructions for execution by the control circuitry. In some embodiments, the method 600 is applied jointly with one or more video codecs, including but not limited to, H.264, H.265/HEVC, H.266/VVC, AV1 and AVS/AVS2/AVS3. In some embodiments, the method 600 is performed by executing instructions stored in the memory (e.g., the coding module 320 of the memory 314) of the computing system. A decoder 122 applies one or more phases (or displacements, or offsets) of a sample 408C of the second color component 404 as the input to perform cross-component prediction. The phases (or displacements, or offsets) refer to a relative position to the coordinate of the co-located sample 408C of the second color component 404 to fetch another adjacent sample 408X of the second color component 404. The adjacent sample 408X is used as the input (instead of the collocated sample) to perform cross-component prediction. A sample 406C of the first color component 402, which is co-located with the sample 408C, is determined based on by a linear or non-linear function (e.g., in any of equations (1.1)-(1.4)) using the sample 408C and/or at least two adjacent samples 408X of the second color component 404. In some embodiments, parameters (e.g., weighing factors, offset) specifying the linear or non-linear function are derived using reference samples 406R and 408R of the first and second color components 402 and 404 in a reference area 502 of the current coding block 400. Alternatively, in some embodiments, at least a subset of the parameters specifying the linear or non-linear function is explicitly signaled via a video bitstream 116.

In some embodiments, the multiple phases include a plurality of candidate phases 412 (FIG. 4) and are defined as one or more integer delta coordinate values to identify (i) horizontal, or (ii) vertical, or (iii) both horizontal and vertical coordinate values of the adjacent samples 408X (e.g., 408-1 to 408-3 in FIG. 4) with reference to the co-located sample 408C of the second color component 404.

In some embodiments, include a plurality of candidate phases 412 (FIG. 4) and are defined as one or more fractional delta coordinate values to identify the (i) horizontal, or (ii) vertical, or (iii) both horizontal and vertical coordinate values of the adjacent samples 408X (e.g., 408-4 and 408-5 in FIG. 4) with reference to the co-located sample 408C of the second color component 404. Further, in some embodiments, an interpolation filter is applied to derive the sample 408X located at a coordinate with fractional delta coordinate values on top of the collocated sample 408C of the second color component 404.

In some embodiments, the interpolation filter can be the same set of filters used to derive a sample value located at a fractional position used in a different image/video coding process (e.g., the motion compensation process, or the directional intra prediction process).

In some embodiments, the multiple phases are applied on the samples 408C and/or 408X in the original resolution of the second color component 404, i.e., without downsampling of the second color component 404.

In some embodiments, selection (e.g., a candidate index 116B) of a phase (e.g., locations of at least two adjacent samples 408X) from multiple candidate phases 412 for encoding/decoding the current coding block 400 is signaled in the video bitstream 116. Stated another way, the video bitstream 116 includes the candidate index 116B selecting one of the plurality of candidate phases 412 for generating the sample 406C of the first color sample 402. In some embodiments, the candidate index 116B is signaled at a block level, including but not limited to super block level, coding block level, prediction block level, transform block level, and/or a fixed block size level. In some embodiments, the candidate index 116B is signaled as a high-level syntax (HLS), including but not limited to, a sequence level parameter, a GOP-level parameter, a picture-level parameter, a subpicture-level parameter, a slice-level parameter, a tile-level parameter, and/or a largest coding block row level parameter. Conversely, in some embodiments, selection of the phase (e.g., locations of at least two adjacent samples 408X) from multiple candidate phases 412 for encoding/decoding the current coding block 400 is implicitly derived without explicit signaling in the video bitstream 116.

In some embodiments, reference samples 406R and 408R of the first and second color components in a reference area 502 (FIG. 5) of the current coding block 400 are used to derive the selected phase (e.g., locations of at least two adjacent samples 408X) of the sample 408C of the current coding block 400. In an example, the reference area 502 includes a left reference region 502L and a top reference region 502T.

In some embodiments, multiple candidate phases 412 are evaluated using the reference samples 406R and 408R of the first and second color components in a reference area 502 (FIG. 5) of the current coding block 400. The evaluation is done by using the reference samples 408R of the second color component 404 of the reference area 502 to predict samples of the first color component 402 of the reference area 502. The predicted samples are compared with the reference samples 406R of the first color component 402 of the reference area 502, and for each sample of the first color component 402, a predication error is determined to be equal to a difference of the predicted sample and the reference sample 406R. The selected candidate phase (e.g., locations of at least two adjacent samples 408X) provides the minimum prediction error (measured by a given error metric, e.g., SAD, or SSE), and is selected for encoding and decoding the current coding block 400 including the samples 406C and 408C.

In some embodiments, neighboring reconstructed samples of the first color component 402 of the current coding block 400 are predicted using the neighboring reconstructed co-located samples 408X of the second color component 404 based on the same function for applying the cross-component prediction. However, the parameters ($c_0$, $c_1$, $c_2$, ..., $c_N$, $c_P$, or $c_B$) used in the function are derived (e.g., using least mean square approximation) using neighboring reference samples 406R of the current coding block 400 of a first color component 402 and the neighboring reference samples 408R of the co-located block of a second color component 404.

In some embodiments, the multiple candidate phases 412 are evaluated using the neighboring reconstructed samples of the co-located block of a second color component 404. The evaluation is done by using the neighboring reconstructed samples (e.g., the top and left neighboring reconstructed samples) of the co-located block of a second color component 404 to predict the neighboring reconstructed sample (e.g., the top and left neighboring reconstructed samples) of the current coding block 400 of a first color component 402, and a subset of candidate phases 412A which provides less prediction errors (measure by a given error metric, e.g., SAD, or SSE) than other candidate phases are marked as the most probable phase for encoding and decoding the current coding block 400, and the index of the selected phase 116B in this subset is signaled into the bitstream 116 and parsed by the decoder 122.

In some embodiments, the selected phase (e.g., locations of at least two adjacent samples 408X) is signaled explicitly. In some embodiments, multiple candidate phase values are predefined and stored locally with the decoder 122, and the index of the selected phase (i.e., the candidate index 116B) is signaled.

In some embodiments, the horizontal and/or vertical component of the phase value is signaled with a given fractional precision 116A. In some embodiments, the fractional precision 116A is signaled at high-level syntax, including but not limited to sequence-level parameter, GOP-level parameter, picture-level, subpicture-level, slice-level, tile-level or largest coding block row level.

In some embodiments, the selected phase (e.g., locations of at least two adjacent samples 408X) is signaled at block level, including but not limited to, super block level, coding block level, prediction block level, transform block level or a fixed block size level.

In some embodiments, a high-level flag or high-level syntax (HLS) is introduced, e.g., at a frame level and using a phase selection flag or syntax 116C, to indicate whether phase selection is enabled or not. If the HLS indicating that this function is not enabled, the filter without phase shifting is applied.

Turning now to some example embodiments.

(A1) In some implementations, a method 600 is implemented for decoding video data. The method 600 includes receiving (602) a video bitstream including a current coding block of a current image frame, wherein the video bitstream comprises (604) a syntax element for a cross-component intra prediction (CCIP) mode indicating whether each sample of a first color component of the current coding block is determined based on one or more samples of a second color component. The method 600 further includes identifying (606) a sample of the first color component and a sample of the second color component that is co-located with the sample of the first color component in the current coding block. The method 600 further includes for each of two or more adjacent samples of the second color component, obtaining (608), from the video bitstream, at least one of (i) a horizonal delta coordinate value and (ii) a vertical delta coordinate value with respect to the sample of the second color component. The method further includes identifying (610) each of the at least two adjacent samples of the second color component in the current coding block based on the at least one of (i) the horizontal delta coordinate value and (ii) the vertical delta coordinate value. The method 600 further includes generating (612) the sample of the first color component based on the at least two adjacent samples of the second color component and reconstructing (614) the current coding block based at least on the generated sample of the first color component from the at least two adjacent samples of the second color component.

(A2) In some embodiments of A1, wherein the at least two adjacent samples have a geometric center that has an offset from a location of the sample of the second color component.

(A3) In some embodiments of A1 or A2, wherein for each adjacent sample of the second color component, the at least one of the horizontal delta coordinate value and the vertical delta coordinate value includes an integer delta coordinate value.

(A4) In some embodiments any of A1-A3, wherein the at least two adjacent samples of the second color component includes a first adjacent sample that is located on the same row or column with the sample of the second color component, and the location of the first adjacent sample is identified by one of the horizontal delta coordinate value and the vertical delta coordinate value.

(A5) In some embodiments any of A1-A3, wherein the at least two adjacent samples of the second color component includes a first adjacent sample that is not located on the same row or column with the sample of the second color component, and the location of the first adjacent sample is identified by both the horizontal delta coordinate value and the vertical delta coordinate value.

(A6) In some embodiments of A1 or A2, wherein the at least two adjacent samples of the second color component includes a first adjacent sample, and the at least one of the horizontal delta coordinate value and the vertical delta coordinate value includes a fractional delta coordinate value.

(A7) In some embodiments of A6, the method 600 further comprises, for the first adjacent sample and based on the fractional delta coordinate value: identifying a set of neighboring samples of the first adjacent sample of the second color component; and interpolating the first adjacent sample with the set of neighboring samples, the interpolated first adjacent sample applied to generate the sample of the first color component.

(A8) In some embodiments of A7, wherein the set of neighboring samples is identified and the first adjacent sample is interpolated based on a predefined filter, and the method 600 further comprises: applying the predefined filter to determine a sample located at a fractional position of the current image frame in at least one of a motion compensation process and a directional intra predication process.

(A9) In some embodiments any of A1-A8, wherein the second color component has a higher resolution than the first color component, and the at least two adjacent samples of the second color component are identified based on a resolution of the second color component.

(A10) In some embodiments any of A1-A9, the method 600 further comprises: extracting, from the video bitstream, a candidate index that selects one of a plurality of candidate phases for identifying the at least two adjacent samples and the at least one of the horizontal delta coordinate value and the vertical delta coordinate value of each adjacent sample for the sample of the second color component.

(A11) In some embodiments of A10, wherein for the current coding block, the candidate index is signaled in the video bitstream at one of a super block level, coding block level, prediction block level, transform block level, and a fixed block size level.

(A12) In some embodiments of A10, wherein the candidate index is signaled as a high-level syntax selected from: a sequence level parameter, a GOP-level parameter, a picture-level parameter, a subpicture-level parameter, a slice-level parameter, a tile-level parameter, and a largest coding block row level parameter.

(A13) In some embodiments any of A1-A12, the method 600 further comprises: identifying a reference area of the current coding block in the current image frame, wherein the reference area includes one or more coding blocks that are adjacent to, and decoded prior to, the current coding block; and based on the reference area, determining a candidate index that selects one of a plurality of candidate phases for identifying the at least two adjacent samples and the at least one of the horizontal delta coordinate value and the vertical delta coordinate value of each adjacent sample for the sample of the second color component of the current coding block.

(A14) In some embodiments of A13, wherein the reference area includes a plurality of reference samples of the first color component and a plurality of reference samples of the second color component, and determining the candidate index further comprises: determining a plurality of prediction errors corresponding to the plurality of candidate phases based on the reference samples of the first color component and the reference samples of the second color component; and identifying the candidate index representing the selected one of the plurality of candidate phases that provides a minimal prediction error of the plurality of prediction errors.

(A15) In some embodiments any of A1-A14, wherein the at least two adjacent samples of the second color component are combined using one or more weighing factors to generate the sample of the first color component.

(A16) In some embodiments of A15, the method 600 further comprises: identifying a reference area of the current coding block in the current image frame, wherein the reference area includes one or more coding blocks that are adjacent to, and decoded prior to, the current coding block; and determining the one or more weighing factors based on a plurality of reference samples of the first color component and a plurality of reference samples of the second color component that is co-located with the plurality of reference samples of the first color component in the reference area.

(A17) In some embodiments of A16, wherein determining the one or more weighing factors further comprises: determining a least mean square (LMS) value based on the plurality of reference samples of the first color component and the plurality of reference samples of the second color component; and iteratively adjusting the one or more weighing factors to reduce the LMS value until the LMS value satisfy a predefined criterion.

(A18) In some embodiments of any of A13, A14, and A16, wherein for the current coding block, the reference area of the current coding block includes one or more of: a top left reference region, a top reference region, a top right reference region, a bottom left reference region, and a left reference region of the current coding block.

(A19) In some embodiments any of A1-A18, the method 600 further comprises: extracting, from the video bitstream, a set of candidate phases and a candidate index, the candidate index selecting one of a set of candidate phases for identifying the at least two adjacent samples and the at least one of the horizontal delta coordinate value and the vertical delta coordinate value of each adjacent sample for the sample of the second color component of the current coding block; wherein the set of candidate phases is selected from a plurality of predefined candidate phases, and has lower prediction errors than remaining candidate phases of the plurality of predefined candidate phases.

(A20) In some embodiments any of A1-A19, wherein the at least one of a horizontal delta coordinate value and a vertical delta coordinate value has a given fractional precision, the method 600 further comprising: extracting, from the video bitstream, the given fractional precision.

(A21) In some embodiments of A20, wherein the given fractional precision is signaled as a high-level syntax selected from: a sequence level parameter, a GOP-level parameter, a picture-level parameter, a subpicture-level parameter, a slice-level parameter, a tile-level parameter, and a largest coding block row level parameter.

(A22) In some embodiments any of A1-A21, the method 600 further comprises: extracting, from the video bitstream, a high-level flag or syntax indicating whether phase selection is applied; wherein in accordance with a determination that the phase selection is applied based on the high-level flag or index, the at least two adjacent samples of the second color component are identified in the current coding block for determining the sample of the first color component.

(A23) In some embodiments any of A1-A22, wherein the video bitstream further includes one or more weighing factors for combining the at least two adjacent samples of the second color component to generate the sample of the first color component.

(A24) In some embodiments any of A1-A23, wherein the video bitstream further includes the at least one of the horizontal delta coordinate value and the vertical delta coordinate value of each adjacent sample for the current coding block.

(A25) In some embodiments any of A1-A24, wherein the first color component and the second color component correspond to two distinct color components of a set of green, blue, and red color components.

(A26) In some embodiments any of A1-A24, wherein the first color component corresponds to a chroma component, and the second color component corresponds to a luma component.

(A27) In some embodiments any of A1-A26, wherein generating the sample of the first color component based on the at least two adjacent samples of the second color component further comprises: based on a plurality of weighing factors, combining the one or more adjacent samples of the second color component with at least one of (1) the sample of the second color component. (2) a non-linear term of a subset of the sample of the second color component and the one or more adjacent samples of the second color component, and (3) a bias term.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A27 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A27 above).

The proposed method may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a video bitstream including a current coding block of a current image frame, wherein the video bitstream comprises a syntax element for a cross-component intra prediction (CCIP) mode indicating whether each sample of a first color component of the current coding block is determined based on one or more samples of a second color component;
   identifying a sample of the first color component and a sample of the second color component that is co-located with the sample of the first color component in the current coding block;
   for each of at least two adjacent samples of the second color component, obtaining, from the video bitstream, at least one of (i) a horizonal delta coordinate value and (ii) a vertical delta coordinate value with respect to the sample of the second color component;
   identifying, in the current coding block, each of the at least two adjacent samples of the second color component based on the at least one of (i) the horizontal delta coordinate value and (ii) the vertical delta coordinate value;
   generating the sample of the first color component based on the at least two adjacent samples of the second color component located in the current coding block; and
   reconstructing the current coding block based at least on the generated sample of the first color component from the at least two adjacent samples of the second color component.

2. The method of claim 1, wherein the at least two adjacent samples have a geometric center that has an offset from a location of the sample of the second color component.

3. The method of claim 1, wherein for each adjacent sample of the second color component, the at least one of the horizonal delta coordinate value and the vertical delta coordinate value includes an integer delta coordinate value.

4. The method of claim 1, wherein the at least two adjacent samples of the second color component includes a first adjacent sample that is located on the same row or column with the sample of the second color component, and the location of the first adjacent sample is identified by one of the horizonal delta coordinate value and the vertical delta coordinate value.

5. The method of claim 1, wherein the at least two adjacent samples of the second color component includes a first adjacent sample that is not located on the same row or column with the sample of the second color component, and the location of the first adjacent sample is identified by both the horizonal delta coordinate value and the vertical delta coordinate value.

6. The method of claim 1, wherein the at least two adjacent samples of the second color component includes a first adjacent sample, and the at least one of the horizontal delta coordinate value and the vertical delta coordinate value includes a fractional delta coordinate value.

7. The method of claim 6, further comprising, for the first adjacent sample and based on the fractional delta coordinate value:
identifying a set of neighboring samples of the first adjacent sample of the second color component; and
interpolating the first adjacent sample with the set of neighboring samples, the interpolated first adjacent sample applied to generate the sample of the first color component.

8. The method of claim 7, wherein the set of neighboring samples is identified and the first adjacent sample is interpolated based on a predefined filter, the method further comprising:
applying the predefined filter to determine a sample located at a fractional position of the current image frame in at least one of a motion compensation process and a directional intra predication process.

9. The method of claim 1, wherein the second color component has a higher resolution than the first color component, and the at least two adjacent samples of the second color component are identified based on a resolution of the second color component.

10. The method of claim 1, further comprising:
extracting, from the video bitstream, a candidate index that selects one of a plurality of candidate phases for identifying the at least two adjacent samples and the at least one of the horizontal delta coordinate value and the vertical delta coordinate value of each adjacent sample for the sample of the second color component.

11. The method of claim 10, wherein for the current coding block, the candidate index is signaled in the video bitstream at one of a super block level, coding block level, prediction block level, transform block level, and a fixed block size level.

12. The method of claim 10, wherein the candidate index is signaled as a high-level syntax selected from: a sequence level parameter, a GOP-level parameter, a picture-level parameter, a subpicture-level parameter, a slice-level parameter, a tile-level parameter, and a largest coding block row level parameter.

13. A computing system, comprising:
control circuitry; and
memory storing one or more programs configured to be executed by the control circuitry, the one or more programs further comprising instructions for:
receiving a video bitstream including a current coding block of a current image frame, wherein the video bitstream comprises a syntax element for a cross-component intra prediction (CCIP) mode indicating whether each sample of a first color component of the current coding block is determined based on one or more samples of a second color component;
identifying a sample of the first color component and a sample of the second color component that is co-located with the sample of the first color component in the current coding block;
for each of at least two adjacent samples of the second color component, obtaining, from the video bitstream, at least one of (i) a horizontal delta coordinate value and (ii) a vertical delta coordinate value with respect to the sample of the second color component;
identifying, in the current coding block, each of the at least two adjacent samples of the second color component in the current coding block based on the at least one of (i) the horizontal delta coordinate value and (ii) the vertical delta coordinate value;
generating the sample of the first color component based on the at least two adjacent samples of the second color component located in the current coding block; and
reconstructing the current coding block based at least on the generated sample of the first color component from the at least two adjacent samples of the second color component.

14. The computing system of claim 13, the one or more programs further comprising instructions for:
identifying a reference area of the current coding block in the current image frame, wherein the reference area includes one or more coding blocks that are adjacent to, and decoded prior to, the current coding block; and
based on the reference area, determining a candidate index that selects one of a plurality of candidate phases for identifying the at least two adjacent samples and the at least one of the horizontal delta coordinate value and the vertical delta coordinate value of each adjacent sample for the sample of the second color component of the current coding block.

15. The computing system of claim 14, wherein the reference area includes a plurality of reference samples of the first color component and a plurality of reference samples of the second color component, determining the candidate index further comprising:
determining a plurality of prediction errors corresponding to the plurality of candidate phases based on the reference samples of the first color component and the reference samples of the second color component; and
identifying the candidate index representing the selected one of the plurality of candidate phases that provides a minimal prediction error of the plurality of prediction errors.

16. The computing system of claim 13, wherein the at least two adjacent samples of the second color component are combined using one or more weighing factors to generate the sample of the first color component.

17. The computing system of claim 16, the one or more programs further comprising instructions for:
identifying a reference area of the current coding block in the current image frame, wherein the reference area includes one or more coding blocks that are adjacent to, and decoded prior to, the current coding block; and
determining the one or more weighing factors based on a plurality of reference samples of the first color component and a plurality of reference samples of the second color component that is co-located with the plurality of reference samples of the first color component in the reference area.

18. The computing system of claim 17, wherein determining the one or more weighing factors further comprises:
determining a least mean square (LMS) value based on the plurality of reference samples of the first color component and the plurality of reference samples of the second color component; and
iteratively adjusting the one or more weighing factors to reduce the LMS value until the LMS value satisfy a predefined criterion.

19. The computing system of claim 13, the one or more programs further comprising instructions for:
extracting, from the video bitstream, a set of candidate phases and a candidate index, the candidate index selecting one of a set of candidate phases for identifying the at least two adjacent samples and the at least one of the horizontal delta coordinate value and the vertical delta coordinate value of each adjacent sample for the sample of the second color component of the current coding block;

wherein the set of candidate phases is selected from a plurality of predefined candidate phases, and has lower prediction errors than remaining candidate phases of the plurality of predefined candidate phases.

20. The computing system of claim 19, wherein for the current coding block, a reference area of the current coding block includes one or more of: a top left reference region, a top reference region, a top right reference region, a bottom left reference region, and a left reference region of the current coding block.

21. A non-transitory computer-readable storage medium storing one or more programs for execution by control circuitry of a computing system, the one or more programs comprising instructions for:

receiving a video bitstream including a current coding block of a current image frame, wherein the video bitstream comprises a syntax element for a cross-component intra prediction (CCIP) mode indicating whether each sample of a first color component of the current coding block is determined based on one or more samples of a second color component;

identifying a sample of the first color component and a sample of the second color component that is co-located with the sample of the first color component in the current coding block;

for each of at least two adjacent samples of the second color component, obtaining, from the video bitstream, at least one of (i) a horizonal delta coordinate value and (ii) a vertical delta coordinate value with respect to the sample of the second color component;

identifying, in the current coding block, each of the at least two adjacent samples of the second color component in the current coding block based on the at least one of (i) the horizontal delta coordinate value and (ii) the vertical delta coordinate value;

generating the sample of the first color component based on the at least two adjacent samples of the second color component located in the current coding block; and reconstructing the current coding block based at least on the generated sample of the first color component from the at least two adjacent samples of the second color component.

22. The non-transitory computer-readable storage medium of claim 21, wherein the at least one of a horizonal delta coordinate value and a vertical delta coordinate value has a given fractional precision, the one or more programs further comprising instructions for:

extracting, from the video bitstream, the given fractional precision.

23. The non-transitory computer-readable storage medium of claim 22, wherein the given fractional precision is signaled as a high-level syntax selected from: a sequence level parameter, a GOP-level parameter, a picture-level parameter, a subpicture-level parameter, a slice-level parameter, a tile-level parameter, and a largest coding block row level parameter.

24. The non-transitory computer-readable storage medium of claim 21, the one or more programs further comprising instructions for:

extracting, from the video bitstream, a high-level flag or syntax indicating whether phase selection is applied;

wherein in accordance with a determination that the phase selection is applied based on the high-level flag or index, the at least two adjacent samples of the second color component are identified in the current coding block for determining the sample of the first color component.

25. The non-transitory computer-readable storage medium of claim 21, wherein the video bitstream further includes one or more weighing factors for combining the at least two adjacent samples of the second color component to generate the sample of the first color component.

26. The non-transitory computer-readable storage medium of claim 21, wherein the video bitstream further includes the at least one of the horizonal delta coordinate value and the vertical delta coordinate value of each adjacent sample for the current coding block.

27. The non-transitory computer-readable storage medium of claim 21, wherein the first color component and the second color component correspond to two distinct color components of a set of green, blue, and red color components.

28. The non-transitory computer-readable storage medium of claim 21, wherein the first color component corresponds to a chroma component, and the second color component corresponds to a luma component.

29. The non-transitory computer-readable storage medium of claim 21, wherein generating the sample of the first color component based on the at least two adjacent samples of the second color component further comprises:

based on a plurality of weighing factors, combining the at least two adjacent samples of the second color component with at least one of (1) the sample of the second color component, (2) a non-linear term of a subset of the sample of the second color component and the at least two adjacent samples of the second color component, and (3) a bias term.

\* \* \* \* \*